(12) United States Patent
He et al.

(10) Patent No.: US 12,217,021 B2
(45) Date of Patent: *Feb. 4, 2025

(54) PROCESSING UNIT WITH SMALL FOOTPRINT ARITHMETIC LOGIC UNIT

(71) Applicant: ADVANCED MICRO DEVICES, INC., Santa Clara, CA (US)

(72) Inventors: Bin He, Orlando, FL (US); Shubh Shah, Santa Clara, CA (US); Michael Mantor, Orlando, FL (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/219,268

(22) Filed: Jul. 7, 2023

(65) Prior Publication Data

US 2024/0143283 A1  May 2, 2024

Related U.S. Application Data (63) Continuation of application No. 17/029,836, filed on Sep. 23, 2020, now Pat. No. 11,720,328.

(60) Provisional application No. 63/044,544, filed on Jun. 26, 2020.

(51) Int. Cl.
  *G06F 7/57* (2006.01)
  *G06F 17/16* (2006.01)
  *G06N 3/08* (2023.01)

(52) U.S. Cl.
  CPC ............ *G06F 7/57* (2013.01); *G06F 17/16* (2013.01); *G06N 3/08* (2013.01)

(58) Field of Classification Search
  CPC .................................. G06F 7/57; G06F 17/16
  USPC ....................................................... 708/209
  See application file for complete search history.

(56) References Cited

U.S. PATENT DOCUMENTS

| | | | |
|---|---|---|---|
| 9,703,531 B2 | 7/2017 | Lutz et al. | |
| 9,720,646 B2 | 8/2017 | Burgess et al. | |
| 2012/0215823 A1 | 8/2012 | Lutz | |
| 2018/0321938 A1 | 11/2018 | Boswell et al. | |
| 2020/0371749 A1* | 11/2020 | Kennedy | G06F 7/5272 |

FOREIGN PATENT DOCUMENTS

| | | | |
|---|---|---|---|
| KR | 20180081106 A | * | 7/2018 |
| KR | 20180081107 A | * | 7/2018 |
| WO | 20190085655 | | 5/2019 |

OTHER PUBLICATIONS

Extended European Search Report issued in Application No. 21828833.0, mailed Jun. 26, 2024.

(Continued)

*Primary Examiner* — Tan V Mai (57) ABSTRACT

A parallel processing unit employs an arithmetic logic unit (ALU) having a relatively small footprint, thereby reducing the overall power consumption and circuit area of the processing unit. To support the smaller footprint, the ALU includes multiple stages to execute operations corresponding to a received instruction. The ALU executes at least one operation at a precision indicated by the received instruction, and then reduces the resulting data of the at least one operation to a smaller size before providing the results to another stage of the ALU to continue execution of the instruction.

20 Claims, 4 Drawing Sheets

(56) References Cited

OTHER PUBLICATIONS

Liang, Getao, "Arithmetic Logic Unit Architectures with Dynamically Defined Precision" PhD Dissertation, University of Tennessee at Knoxville, Dec. 2015, 131 pages <https://trace.tennessee.edu/utk_graddiss/3592>.

* cited by examiner

PROCESSING UNIT WITH SMALL FOOTPRINT ARITHMETIC LOGIC UNIT

CROSS-REFERENCE TO RELATED APPLICATIONS

The present application is a Continuation application of U.S. patent application Ser. No. 17/029,836, entitled "PROCESSING UNIT WITH SMALL FOOTPRINT ARITHMETIC LOGIC UNIT", and filed on Sep. 23, 2020, which claims priority to Provisional Patent Application Ser. No. 63/044,544, entitled "PROCESSING UNIT WITH SMALL FOOTPRINT ARITHMETIC LOGIC UNIT" and filed on Jun. 26, 2020, the entirety of each is incorporated by reference herein.

BACKGROUND

As computing operations have grown more complex processors have increasingly employed processing units that are specially designed and configured to perform designated operations on behalf of the processor. For example, to efficiently execute artificial intelligence, machine learning, and similar operations, some processors employ one or more artificial intelligence (AI) accelerators with multiple processing elements (also commonly referred to as processor cores or compute units) that concurrently execute multiple instances of a single program on multiple data sets. A central processing unit (CPU) of the processor provides commands to the AI accelerator, and a command processor (CP) of the AI accelerator decodes the commands into one or more operations. Execution units of the accelerator, such as one or more arithmetic logic units (ALUs), execute the operations to perform artificial intelligence functions and similar operations.

BRIEF DESCRIPTION OF THE DRAWINGS

The present disclosure are better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate systems and techniques in which a parallel processing unit, such as an artificial intelligence (AI) accelerator, employs an arithmetic logic unit (ALU) having a relatively small footprint, thereby reducing the overall power consumption and circuit area of the processing unit. To support the smaller footprint, the ALU includes multiple stages to execute operations corresponding to a received instruction. The ALU executes at least one operation at a precision indicated by the received instruction, and then reduces the resulting data of the at least one operation (that is, the intermediate result) to a smaller size before providing the results to another stage of the ALU to continue execution of the instruction, and so forth for each successive stage. Because the size of these intermediate results is reduced, the later stages of the ALU are able to employ relatively small registers and a smaller amount of other circuitry to support their corresponding operations, thereby reducing the overall size and power consumption of the ALU.

To illustrate via an example, in some embodiments the ALU includes stages to implement a multiply-accumulate instruction, such as a dot product instruction, wherein a multiplier stage multiplies N sets of operands to generate N products, and an adder stage adds the N products together to generate the final dot product result. The ALU includes an alignment stage between the multiplier stage and the adder stage that reduces the size of the N products. For example, in some embodiments the alignment stage identifies the largest product of the N products and aligns the other products with the largest product by shifting the corresponding mantissas. During the shifting process, the less significant bits of the mantissas are discarded, so that each mantissa is set to a specified size (e.g. 32 bits). In contrast, a conventional ALU employs relatively large mantissas at the alignment stage (e.g., mantissas of 80 bits or more) to ensure full precision of the eventual dot product result, requiring the adder stage to use large registers and a larger number of adder elements, and thus consuming a larger amount of power and circuit area.

Figure 1:
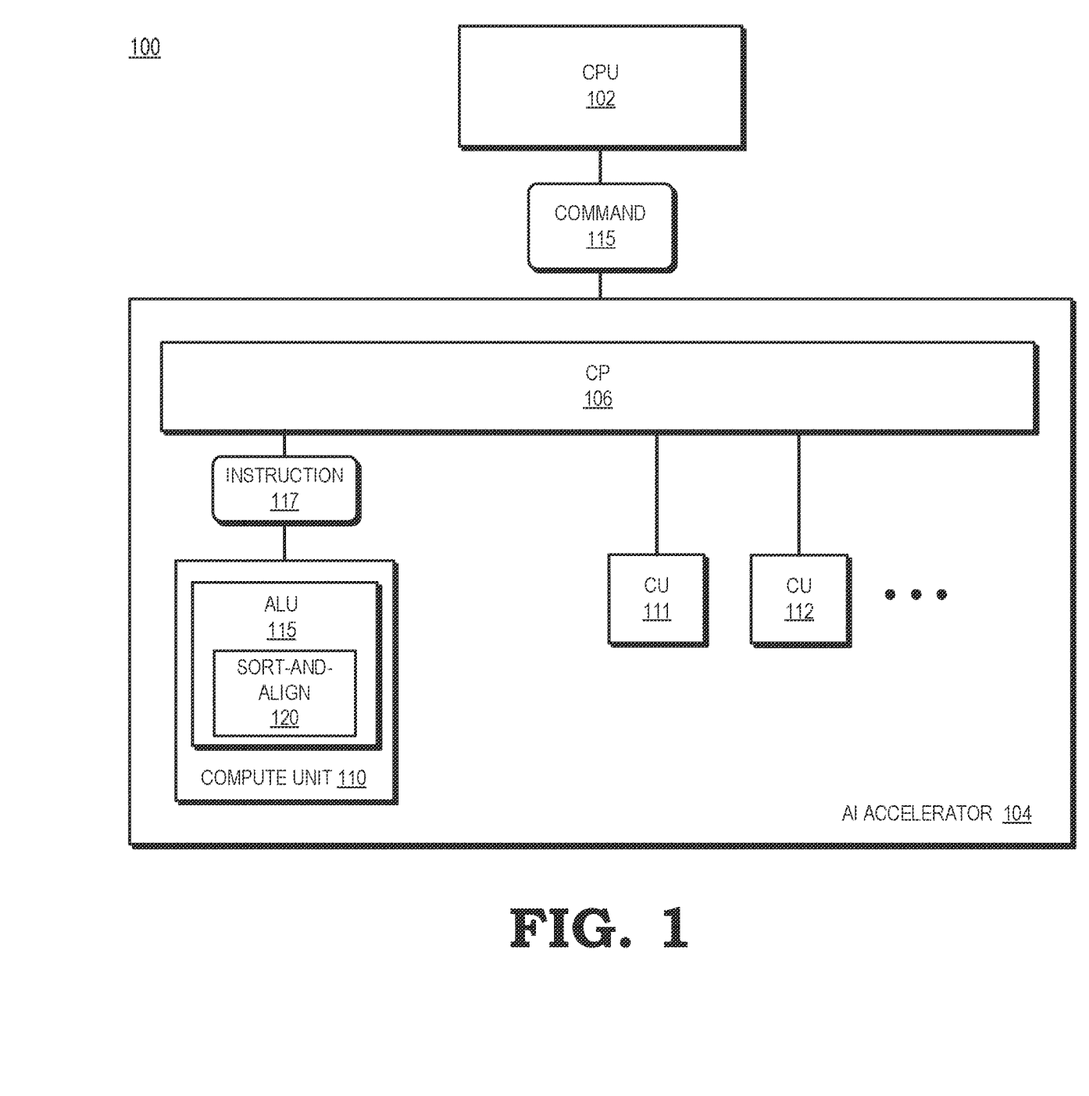
FIG. 1 is a block diagram of a processor including a processing unit with a arithmetic logic unit (ALU) having a relatively small footprint in accordance with some embodiments.

FIG. 1 illustrates a block diagram of a processor 100 having a small-footprint ALU in accordance with some embodiments. The processor 100 is generally configured to execute sets of instructions (e.g., computer programs) in order to carry out specified tasks on behalf of an electronic device. Accordingly, in different embodiments, the processor 100 is part of a desktop computer, laptop computer, tablet computer, server, game console, smartphone, and the like. To support execution of instructions on behalf of the electronic device, the processor 100 includes a central processing unit (CPU) 102 and an artificial intelligence (AI) accelerator 104. In some embodiments, the processor 100 includes additional modules and circuitry, not illustrated at FIG. 1, to support instruction execution, such as memory modules (e.g., a memory hierarchy including one or more caches), input/output (I/O) interfaces, additional processing units such as a graphics processing unit (GPU), and the like.

To efficiently execute the sets of instructions, the processor 100 generally assigns different types of operations to the CPU 102 and the AI accelerator 104. Thus, in some embodiments the CPU 102 performs general purpose operations for the processor 100, including fetching sets of instructions from memory, decoding those instructions into sets of operations, executing the operations, and retiring the executed instructions. An example of these general-purpose operations is executing an operating system to perform management operations for the electronic device, such as memory management, provision of a user interface for the electronic device, and the like.

In contrast to the general purpose operations executed by the CPU 102, the AI accelerator 104 includes modules and circuitry to efficiently execute operations associated with artificial intelligence operations, such as operations associated with machine learning, neural networks, inference engines, expert systems, deep learning, and the like. Accordingly, in different embodiments the AI accelerator 104 is one of a number of processing units employed to execute operations associated with artificial intelligence, such as a vector processing unit, a graphics processing unit (GPU), a general-purpose GPU (GPGPU), a non-scalar processing unit, a highly-parallel processing unit, an AI processing unit, an inference engine, a machine learning processing unit, a neural network processing unit, other multithreaded processing units, and the like.

To support execution of AI operations, the AI accelerator 104 includes a command processor (CP) 106 and a plurality of compute units, including compute units (CUs) 110, 111, and 112. The command processor 106 receives commands (e.g., command 118) from the CPU 102, wherein each command indicates one or more AI operations to be executed at the AI accelerator 104. For example, in different embodiments the command 118 indicates one or more of a neural network operation (e.g., a convolutional operation for neural network training, an inferencing operation, and the like), a machine learning operation, a vector processing operation, and the like, or any combination thereof. The CP 106 interprets the command to generate one or more instructions (e.g., instruction 117), wherein the instructions delineate the AI operations to be executed.

The compute units 110-112 each include circuitry to execute the instructions generated by the CP 106. Accordingly, in some embodiments, each of the compute units 110 112 includes one or more vector stream processors (VSPs), single-instruction multiple-data (SIMD units), or other processing elements, or any combination thereof, to execute the received instructions. In some embodiments, to increase processing efficiency, the CP 106 organizes the instructions into specified sets, sometimes referred to as wavefronts or warps, and assigns the wavefronts to different ones of the compute units 110-112 according to specified scheduling criteria. Each compute unit executes its assigned portion of the wavefront in parallel with other compute units.

For example, assume a wavefront is to execute a specified set of mathematical operations with a relatively large set of data elements, such as elements of a large matrix representing an aspect of a neural network. To execute the wavefront, the CP 106 assigns different subsets of the elements of the matrix to different compute units, and each compute unit executes, in parallel, the specified set of mathematical operations with the corresponding assigned subset of elements. The compute units thereby efficiently execute the mathematical operations on the large set of data elements.

To execute mathematical operations, each compute unit includes one or more ALUs, such as an ALU 115 of compute unit 110. In some embodiments, the compute unit 110 includes an instruction pipeline (not shown) including additional stages to support instruction execution, including a fetch stage to fetch instructions from an instruction buffer, a decode stage, execution units in addition to the ALU 115, and a retire stage to retire executed instructions. The decode stage includes circuitry to decode instructions (e.g., instruction 117) received from the fetch stage into one or more operations and dispatches the operations to one of the execution units, according to the type of operation. In some embodiments, each operation is identified by a corresponding op code, and the decode stage identifies the execution unit based on the op code and provides information to the execution unit indicating the op code. The execution unit employs the op code, or information based thereon, to determine the type of operation to be executed, and executes the indicated operation.

For example, some operations, and associated op codes, indicate arithmetic operations. In response to identifying that a received instruction indicates an arithmetic operation, the decode stage determines the op code for the operation and provides the op code to the ALU 115, along with other information such as the operands to be used for the arithmetic operation. The ALU 115 executes the operation indicated by the op code using the indicated operands stored at a register file or other memory location. In some embodiments, the operation provided by the ALU 115 indicates the precision of the operands and the operation to be executed. For example, in some embodiments the decode stage provides one operation (and corresponding op code) for a 16-bit multiplication operation using 16-bit operands and provides another operation (and corresponding op code) for a 32-bit multiplication operation using 32-bit operands.

In addition, the decode stage generates operations, with corresponding op codes, for mixed precision mathematical operations, wherein the mixed precision operations employ operands of different sizes. For example, in some embodiments, the decode stage generates, based on corresponding instructions, multiply-accumulate (MACC) operations that multiply operands of one size (e.g. 16 bits) and accumulate the results with an operand of a different size (e.g. 32 bits). For example, in some embodiments the operations include a mixed precision dot product operation (designated DOT4_F32_F16) that multiplies four sets of two 16-bit floating point operands and adds the multiplication results to each other and to a 32-bit floating point operand.

The ALU 115 includes different stages to execute the different mathematical operations such as multiplication stage including one or more multipliers to perform multiplication operations and an addition stage to perform additions. For more complex mathematical operations such as the DOT4_F32_F16 operation, the ALU employs different stages to execute the corresponding operations and passes the results from one stage to another stage. For example, to execute the DOT4_F32_F16 operation, the ALU 115 executes the multiplication operation at the multiplication stage and the addition operations at the adder stage.

Conventionally, in order to maintain full precision for a mathematical operation, an ALU maintains relatively large operands at each stage. For example, 80-bit mantissas are used for the multiplication products to maintain full precision for DOT4_F32_F16 operations. That is, in order to maintain full precision for the DOT4_F32_F16 operation, an ALU typically stores the products generated by the multiplication stage using 80-bit, or higher, mantissas. Using these relatively large operands consumes a relatively large amount of circuit area and power, such as by requiring larger registers and a higher number of adding elements at the adder stage of the ALU 115. However, for some types of operations, including AI operations, maintaining these relatively large mantissas does not improve the overall result of the operations. For example, in some cases the data operands employed by the AI operations are relatively low precision operands, such that maintaining the operands at high precision does not meaningfully affect the overall result of the AI operation.

To reduce power consumption and support a relatively small footprint, the ALU 115 includes a sort-and-align stage 120 that reduces the size of the operands generated by one stage of the ALU 115 before those operands are passed to the next stage. For example, in some embodiments, for the DOT4_F32_F16 operation the sort-and-align stage 120 reduces the size of the mantissas generated by the multiplication stage before providing those mantissas to the adder stage for adding.

To illustrate, in some embodiments the sort-and-align stage 120 receives the products from the multiplication stage wherein each product is a floating-point operand represented by a mantissa of a specified size (e.g., a 32-bit mantissa) and corresponding exponent. The sort-and-align stage 120 stores each mantissa in a register corresponding to a specified mantissa size (e.g., a 32-bit register to store 32-bit mantissas). The sort-and-align stage 120 identifies the largest product among the received products. For the other products, the sort-and-align stage 120 shifts the mantissa and makes corresponding adjustments to the corresponding exponent, until each product has the same exponent as the largest product. During the shifting process, each mantissa is maintained in the mantissa register, such that, in some cases, the less-significant bits of the mantissas are shifted out of the registers and combined to form a corresponding sticky bit for each mantissa. In other words, at least some of the mantissas are reduced in overall size, or bit width, to maintain each mantissa in a relatively small register.

After the shifting and exponent adjustment, the sort-and-align stage 120 provides the operands to an adder stage to perform the addition of the products. As noted above, because of the shifting and exponent adjustment, the mantissas of the products are maintained in relatively small registers. Accordingly, the adder stage is able to employ a relatively small number of adder elements to perform the addition of the products, thereby supporting a small footprint for the ALU 115.

Figure 2:
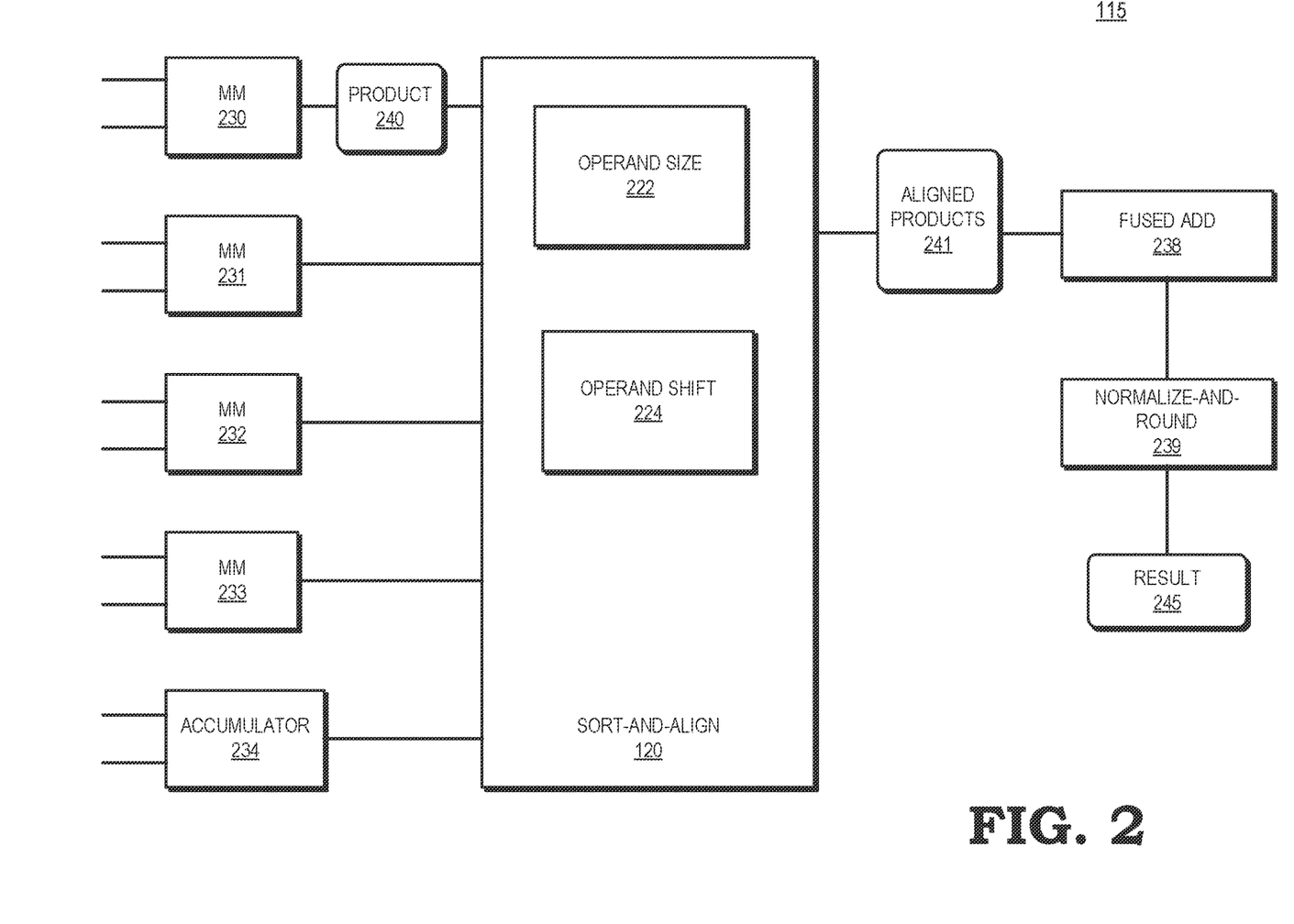
FIG. 2 is a block diagram of the ALU of FIG. 1 having a sort-and-align stage that reduces a size of ALU operands before passing the operands to another stage of the ALU in accordance with some embodiments.

FIG. 2 is a block diagram illustrating the ALU 115 in greater detail in accordance with some embodiments. In the depicted example, the ALU 115 includes a plurality of matrix multipliers ("MM") 230, 231, 232, and 233, an accumulator 234, the sort-and-align stage 120, a fused adder 238, and a normalize-and-round stage 239. The matrix multipliers 230-233 and accumulator 234 form the multiplication stage for the ALU 115. In particular, for a floating-point dot product operation (e.g., a DOT4_F32_F16 operation), each of the matrix multipliers 230-233 receives a corresponding set of floating-point input operands and performs a floating-point multiplication with the received operands to generate a product (e.g., product 240).

The accumulator 234 stores or generates a constant value C that is to be added to the products generated by the matrix multipliers 230-233. In some embodiments, the constant value C is an operand identified by the dot product operation, the accumulator 234 is a register that stores the identified operand. In other embodiments, the constant value C is an accumulated value based on other operations executed at the compute unit 110, and the accumulator 234 includes circuitry to perform the accumulation of the constant value C.

The sort-and-align stage 120 receives the products from the matrix multipliers 230-233 and the constant value C from the accumulator 234 and prepares these operands for addition via a sort-and-align process. To support the sort-and-align process, the sort-and-align stage 120 includes an operand size module 222 and an operand shift module 224. The operand size module 222 includes circuitry to identify which of the received products, and constant value C, has the largest value. The operand shift module 224 includes circuitry to shift the received operands, and effect corresponding adjustments to the corresponding exponents, so that each operand is aligned with the largest operand identified by the operand size module 222.

To illustrate via an example, in some cases the operand size module 222 identifies the product 240 as being the largest operand, with an exponent value of N. The operand size module 222 further identifies another product, designated Product A, as being less than the product 240, with an exponent value of N−2. The operand shift module 224 adjusts the exponent for Product A to the value N, and correspondingly shifts the mantissa for product A two bits to the right, so that the two least significant bits are shifted out of the mantissa. In some embodiments, the operand shift module 224 combines the shifted-out bits via a logical OR operation to generate the sticky bit for the shifted mantissa.

The result of the shifting by the operand shift module 224 is that all the products and the constant value C are aligned for adding. As noted above, during the shifting process the less significant bits of at least some of the products are discarded, so that all of the products are maintained in registers of a specified size (e.g., 32-bit registers). In some cases, the shifting results in the products having a lower precision than is mandated by the dot product operation. For example, in some embodiments the dot product operation, in order to comply with a specified instruction set architecture (e.g. an x86 instruction set architecture) indicates a precision associated with the operation, such as designating a single-precision operation or a double-precision operation. To ensure the specified precision, a conventional ALU employs large registers at the sort-and-align stage, so that mantissa bits are not discarded during the sort-and-align process. In contrast, the sort-and-align stage 120 allows mantissa bits to be discarded during the shift and align process, so that the mantissas are maintained in relatively small registers.

The fused adder 238 receives the aligned products 241 (including the aligned constant value C) from the sort-and-align stage 120. The fused adder 238 adds the mantissa values of the aligned products 241 to generate a provisional value for the result mantissa. To add the mantissa values, the fused adder 238 includes a plurality of adder elements, wherein each adder element adds at least two bits of corresponding mantissas. Because the mantissas of the aligned products 241 are maintained in relatively smaller registers, as described above, the fused adder 238 employs relatively few adder elements, thereby supporting a reduced footprint, and lower power consumption, for the ALU 115.

The fused adder 238 provides the provisional mantissa value to the normalization and rounding stage 239, which normalizes the provisional mantissa value. For example, in some embodiments the normalization and rounding stage 239 shifts the provisional mantissa value to remove any leading zeroes in the mantissa. In some embodiments, the normalization and rounding stage 239 adjusts the provisional mantissa to force the integer portion of the provisional mantissa to be a specified value (e.g. 1). Based on the adjustments made to the mantissa, the normalization module adjusts the provisional exponent value provided to preserve the overall value of the floating-point result value.

After normalization, the normalization and rounding stage 239 rounds the result based on specified rounding rules, such as rounding the result to the nearest even value, thereby generating the final result 245.

Figure 3:
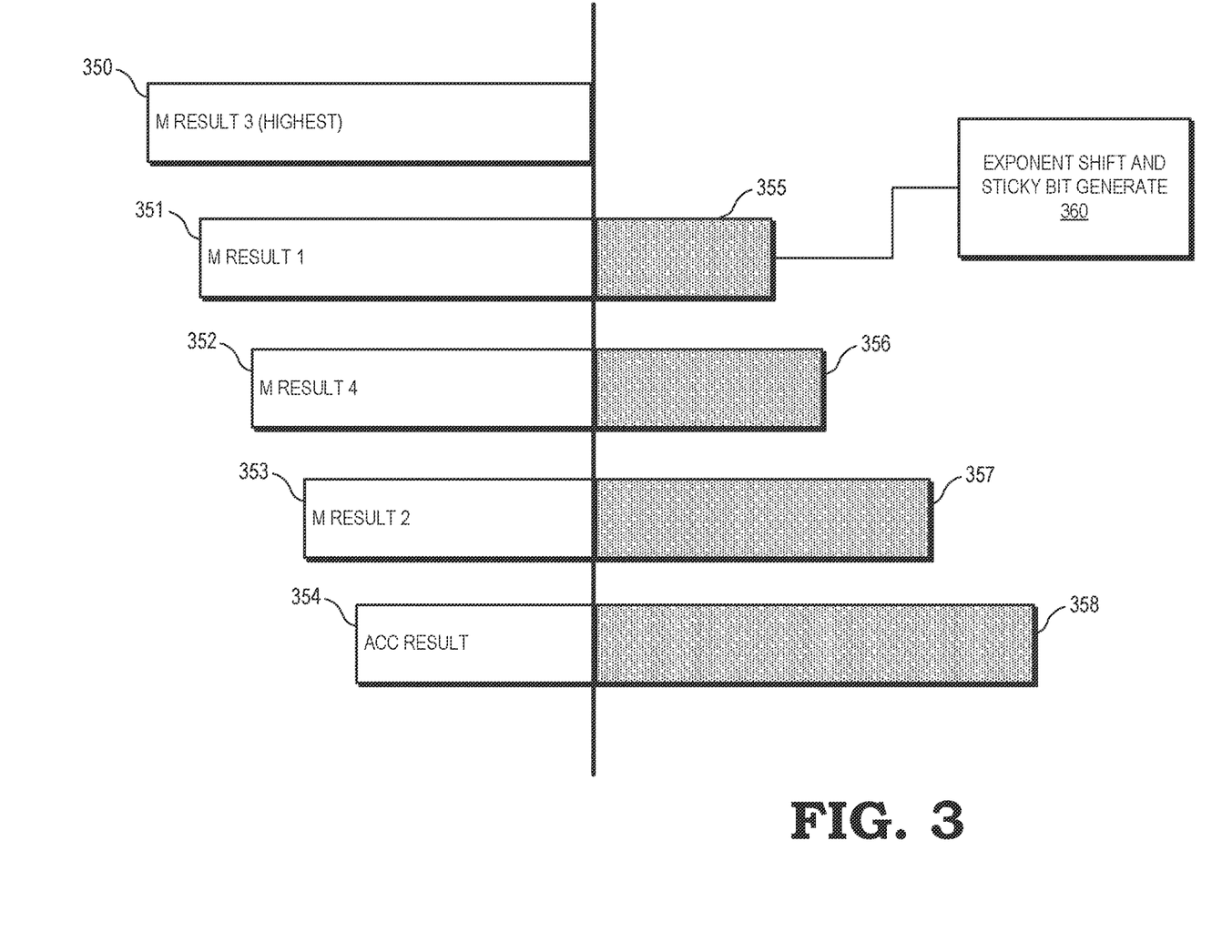
FIG. 3 is a block diagram of the ALU of FIG. 2 illustrating an example reduction in the size of ALU operands before passing the operands to another stage of the ALU in accordance with some embodiments.

FIG. 3 illustrates an example of the sort-and-align stage 120 aligning mantissas of the products generated by the matrix multipliers 230-233. In the depicted example, each mantissa is stored at a corresponding register, designated registers 350, 351, 352, 353, and 354. The mantissas are illustrated in descending order of operand size from top to bottom. Thus, the operand generated by matrix multiplier 232 is the highest operand (that is, has the greatest value)

and the corresponding mantissa (designated M Result 3) is stored at the register 350. The operand generated by matrix multiplier 230 is the next-highest operand, and the corresponding mantissa (designated M Result 1) is stored at the register 351. The operand generated by matrix multiplier 233 is the next-highest operand, and the corresponding mantissa (designated M Result 4) is stored at the register 352. The operand generated by matrix multiplier 232 is the next-highest operand, and the corresponding mantissa (designated M Result 2) is stored at the register 353. Finally, the operand generated by the accumulator 234 is the lowest operand (the operand having the least value), and the corresponding mantissa (designated ACC Result) is stored at the register 354.

To align the operands, the sort-and-align stage 120 shifts the exponent for each operand so that each exponent matches the exponent for the highest operand. The sort-and-align stage 120 then shifts each mantissa to account for the change in the corresponding exponent. Thus, for example, if the exponent for an operand is increased by two, the shift and align module 120 shifts the corresponding mantissa by two bit positions to the right.

The demarcation in the alignment point for the different mantissas is represented by a line 359. That is, the line 359 represents the point at which all the mantissas are aligned. Each mantissa smaller than the mantissa for the largest operand is shifted to the right, such that some portion of the mantissa is to the right of the line 359. These portions are illustrated in gray fill, and denote the bits of the mantissa that are used to form the sticky bit for the mantissa, and then discarded. Thus, in the illustrated example, for the M Result 1 operand the sort-and-align stage 120 shifts the operand to the right, so that bits 355 are provided to a sticky bit generation module 360 to generate the sticky bit for the M Result 1. The bits 355 are then discarded, and not used by the fused adder 238 during addition. Similarly, for M Result 4, the bits 356 are used to form the corresponding sticky bit, then discarded, for M Result 2 the bits 357 are used to form the corresponding sticky bit and then discarded, and for the Acc Result the bits 358 are used to form the corresponding sticky bit and then discarded.

As illustrated, the shaded regions representing the bits 355-358 are of different sizes, indicating a different number of bits are shifted out and discarded for each corresponding mantissa. For example, in some embodiments the bits 355 represents one bit, the bits 356 represents 3 bits, the bits 357 represent 4 bits, and the bits 358 represent 8 bits. Further, in some cases more than one operand has the highest exponent, such that more than one of the corresponding mantissas is not shifted during the sort-and-align process.

Figure 4:
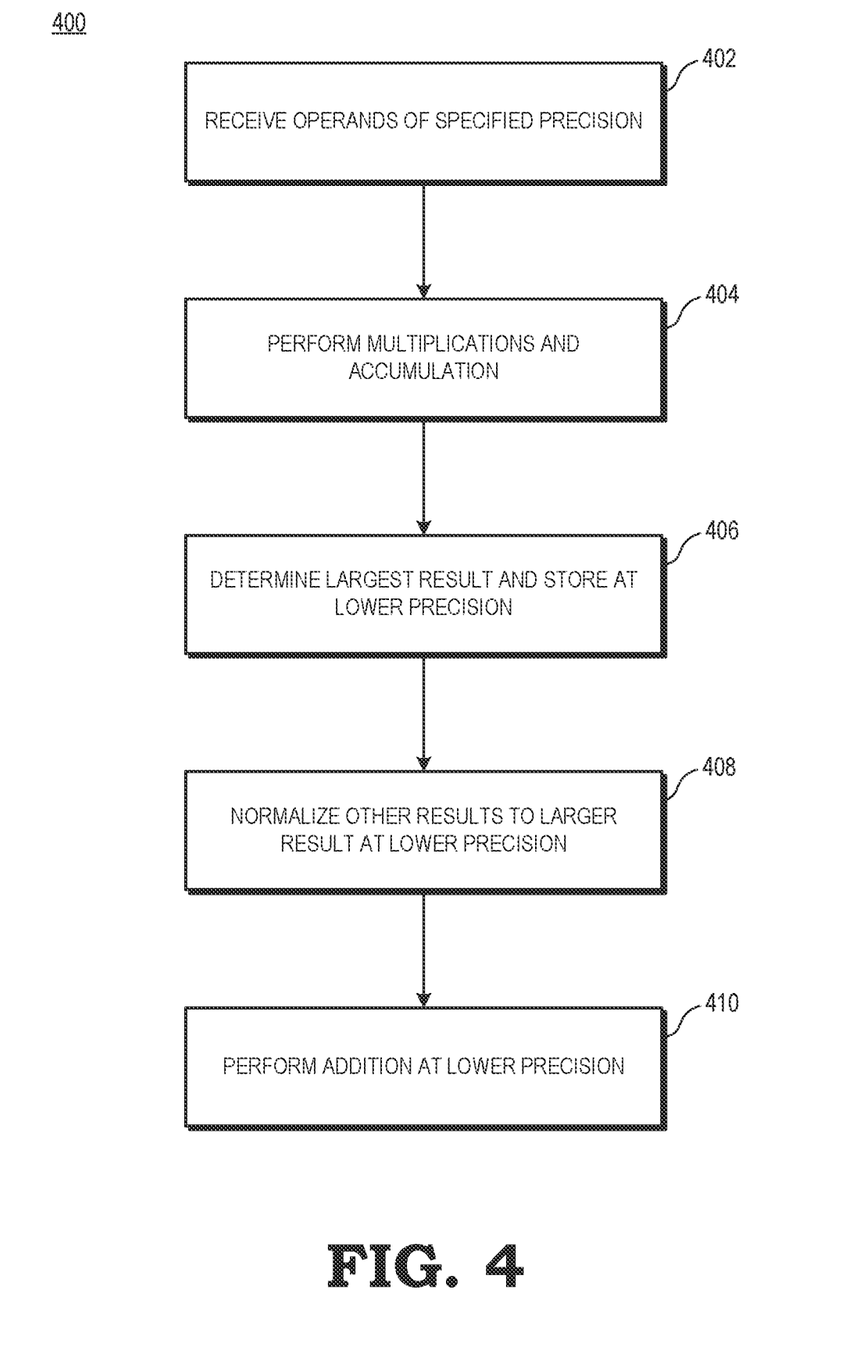
FIG. 4 is a flow diagram of a method of reducing a size of ALU operands at an ALU of a processing unit in accordance with some embodiments.

FIG. 4 illustrates a method 400 of performing a dot product operation at an arithmetic logic unit by discarding a portion of one or more operands during the operation in accordance with some embodiments. The method 400 is described with respect to an example implementation at the ALU 115 of FIG. 1. At block 402 the ALU 115 receives floating point operands of a specified precision, such as single-precision or double-precision operands. At block 404, the multipliers 230-233 multiply the corresponding operands to generate the corresponding products. In addition, the accumulator 234 executes the accumulation to generate the constant value C.

At block 406, the sort-and-align stage 120 determines which of the products and the constant value C has the largest value. At block 408, the sort-and-align stage 120 adjusts the exponent for each product and the constant value C so that all the products and constant value C have an exponent that matches the exponent of the highest value. The sort-and-align stage 120 then shifts each mantissa to correspond to any change in the corresponding exponent. As explained above, during the shifting, the less significant bits of one or more of the mantissas are shifted out, are used to form the sticky bit for the mantissa, and are then discarded. At block 410, the fused adder 238 adds the aligned mantissas, which are then normalized and rounded by the normalize and rounding stage 239, to generate the result 245.

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium is implementable in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
   executing a plurality of mathematical operations with a plurality of operands using an arithmetic logic unit (ALU); and reducing a first operand and a second operand of the plurality of operands by discarding at least a portion of each of the first operand and the second operand, wherein the discarded portion of the first operand and the discarded portion of the second operand include different numbers of bits.

2. The method of claim 1, wherein the mathematical operations are performed in response to a multiply-accumulate instruction.

3. The method of claim 2, wherein reducing the first operand comprises reducing the first operand at a sort-and-align stage of the ALU.

4. The method of claim 3, wherein the reducing the first operand comprises reducing the first operand by shifting a mantissa of the first operand to align with a mantissa of a second operand.

5. The method of claim 4, wherein shifting the mantissa of the first operand comprises shifting the mantissa of the first operand to align with the mantissa of the second operand in response to determining that the second operand is a largest operand of the plurality of operands.

6. The method of claim 4, further comprising:
generating a sticky bit for the first operand based upon the discarded portion of the first operand.

7. The method of claim 4, further comprising:
adding the shifted mantissa of the first operand to the second operand.

8. A processing unit, comprising:
an arithmetic logic unit (ALU) configured to execute a plurality of mathematical operations with a plurality of operands,
wherein the ALU is further configured to reduce a first operand and a second operand of the plurality of operands by discarding at least a portion of each of the first operand and the second operand, and wherein the discarded portion of the first operand and the discarded portion of the second operand include different numbers of bits.

9. The processing unit of claim 8, wherein the mathematical operations are performed in response to a multiply-accumulate instruction.

10. The processing unit of claim 9, wherein the ALU includes a sort-and-align stage to reduce the first operand.

11. The processing unit of claim 10, wherein the sort-and-align stage is to reduce the first operand by shifting a mantissa of the first operand to align with a mantissa of a second operand.

12. The processing unit of claim 11, wherein the sort-and-align stage is to shift the mantissa of the first operand to align with the mantissa of the second operand in response to determining that the second operand is a largest operand of the plurality of operands.

13. The processing unit of claim 11 wherein the sort-and-align stage is to generate a sticky bit for the first operand based upon the discarded portion of the first operand.

14. The processing unit of claim 11, wherein the sort-and-align stage includes an adder to add the shifted mantissa of the first operand to the second operand.

15. A non-transitory computer readable medium embodying a set of executable instructions, the set of executable instructions to manipulate at least one processor to:
execute a plurality of mathematical operations with a plurality of operands using an arithmetic logic unit (ALU); and
reduce a first operand and a second operand of the plurality of operands by discarding at least a portion of each of the first operand and the second operand, wherein the discarded portion of the first operand and the discarded portion of the second operand include different numbers of bits.

16. The computer readable medium of claim 15, wherein the mathematical operations are performed in response to a multiply-accumulate instruction.

17. The computer readable medium of claim 16, wherein reducing the first operand comprises reducing the first operand at a sort-and-align stage of the ALU.

18. The computer readable medium of claim 17, wherein the reducing the first operand comprises reducing the first operand by shifting a mantissa of the first operand to align with a mantissa of a second operand.

19. The computer readable medium of claim 18, wherein shifting the mantissa of the first operand comprises shifting the mantissa of the first operand to align with the mantissa of the second operand in response to determining that the second operand is a largest operand of the plurality of operands.

20. The computer readable medium of claim 18, wherein the instructions are further to manipulate the at least one processor to:
generate a sticky bit for the first operand based upon the discarded portion of the first operand.

* * * * *